United States Patent
Naim et al.

(10) Patent No.: US 9,444,533 B1
(45) Date of Patent: Sep. 13, 2016

(54) METHOD TO IMPROVE MULTIPLE USER MULTIPLE INPUT MULTIPLE OUTPUT PAIRING IN A NETWORK

(71) Applicant: SPRINT COMMUNICATIONS COMPANY L.P., Overland Park, KS (US)

(72) Inventors: Muhammad Ahsan Naim, Sterling, VA (US); Yu Zhou, Herndon, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 23 days.

(21) Appl. No.: 14/720,367

(22) Filed: May 22, 2015

(51) Int. Cl.
*H04W 72/00* (2009.01)
*H04B 7/04* (2006.01)
*H04W 64/00* (2009.01)
*H04W 72/04* (2009.01)

(52) U.S. Cl.
CPC ......... *H04B 7/0452* (2013.01); *H04W 64/006* (2013.01); *H04W 72/048* (2013.01); *H04W 72/0453* (2013.01)

(58) Field of Classification Search
CPC .......... H04B 7/0452; H04W 72/0453; H04W 72/048; H04W 64/006
USPC .......... 455/452.1, 41.2, 426.1, 450
See application file for complete search history.

(56) References Cited

U.S. PATENT DOCUMENTS

| | | | | |
|---|---|---|---|---|
| 2014/0293803 A1* | 10/2014 | Wang | ............... | H04W 24/02 370/252 |
| 2015/0131572 A1* | 5/2015 | Fan | ............... | H04W 52/146 370/329 |
| 2015/0215770 A1* | 7/2015 | Chan | ............... | H04W 12/04 455/456.1 |

* cited by examiner

*Primary Examiner* — Dhaval Patel

(57) ABSTRACT

A method and system for providing MU-MIMO pairings of mobile handsets in a network is provided. In one embodiment, the method includes facilitating MU-MIMO pairings of mobile handsets served by different transmitting/receiving components serving individual sectors of a base station using a central monitoring server and location information for each of the mobile handsets. In another embodiment, the method includes facilitating MU-MIMO pairings between mobile handsets served by different transmitting/receiving components in different sectors of coverage across separate access components using a central monitoring server and location information for each of the mobile handsets.

20 Claims, 6 Drawing Sheets

METHOD TO IMPROVE MULTIPLE USER MULTIPLE INPUT MULTIPLE OUTPUT PAIRING IN A NETWORK

SUMMARY

A high level overview of various aspects of the invention is provided here for that reason, to provide an overview of the disclosure and to introduce a selection of concepts that are further described below in the detailed-description section. This summary is not intended to identify key features or essential features of the claimed subject matter, nor is it intended to be used as an aid in isolation to determine the scope of the claimed subject matter. The scope of the invention is defined by the claims.

In brief, and at a high level, this disclosure describes, among other things, a method and system for providing MU-MIMO pairings of mobile handsets in a network across different broadcast sectors and/or different access points/base stations. In one embodiment, a server is configured to monitor the location of mobile handsets in the network, and coordinate optimal MU-MIMO pairings across broadcast sectors and/or different base stations/access points.

In a first aspect, a method for providing MU-MIMO pairings in RF transmission is provided. The method comprises receiving a first signal providing a first location of a first mobile handset that communicates with a first sector of a base station, and receiving a second signal providing a second location of a second mobile handset that communicates with a second sector of the base station, wherein the first and the second sectors are different sections of a broadcast arc from the base station. The method further comprises determining from the first and the second locations if the first mobile handset and the second mobile handset are transmitting to the base station from an angle of separation that is at least 90 degrees, and upon determining that the first mobile handset and the second mobile handset are transmitting to the base station from an angle of separation that is at least 90 degrees, pairing the first and the second mobile handsets for MU-MIMO uplink transmission with the base station.

In a second aspect, a method for providing MU-MIMO pairings in RF transmission is provided. The method comprises receiving a first signal providing a first location of a first mobile handset that communicates with a first access component, and receiving a second signal providing a second location of a second mobile handset that communicates with a second access component. The method further comprises determining from the first location and the second location if the first mobile handset and the second mobile handset have an angle of separation from the first and the second access components, respectively, that is at least 90 degrees, and upon determining that the first mobile handset and the second mobile handset have an angle of separation from at least one of the first and the second access components that is at least 90 degrees, pairing the first and the second mobile handsets for MU-MIMO uplink transmission with one of the first and the second access components with which the first and the second mobile handsets have an angle of separation that is at least 90 degrees.

In a third aspect, a system for providing MU-MIMO pairings in RF transmission is provided. The system comprises a server associated with first and second access components, the server comprising one or more computer-readable media storing computer-useable instructions that, when used by the server, allow the server to receive a first radio signal providing a first location of a first mobile handset communicating with the first access component, receive a second radio signal providing a second location of a second mobile handset communicating with the second access component, determine from the first and the second locations if an angle of separation between the first and the second mobile handsets relative to the first and the second access components, respectively, is at least 90 degrees, and upon determining that the angle of separation between the first and the second mobile handsets is at least 90 degrees with respect to at least one of the first and the second access components, pairing the first and the second mobile handsets for MU-MIMO uplink transmission with one of the first and the second access components with which the first and the second mobile handsets have an angle of separation that is at least 90 degrees.

Throughout this disclosure, several acronyms and shorthand notations may be used to aid the understanding of certain concepts pertaining to the associated network system, services, and devices. These acronyms and shorthand notations are intended to help provide an easy methodology of communicating the ideas expressed herein and are not meant to limit the scope of the present invention. Further, various technical terms are used throughout this description. An illustrative resource that fleshes out various aspects of these terms can be found in Newton's Telecom Dictionary, $27^{th}$ Edition (2012). The following is a list of relevant acronyms:

BS Base Station
CDMA Code Division Multiple Access
DL Downlink
EnodeB Evolved Node B
GIS Geographic Information System
2GPP $2^{nd}$ Generation Partnership Project
3GPP $3^{rd}$ Generation Partnership Project
GPRS General Packet Radio Service
GPS Global Positioning System
GSM Global System for Mobile Communications
LTE Long-Term Evolution
MD Mobile Device
MU-MIMO Multiple User Multiple Input Multiple Output
RCPI Received Channel Power Indicator
RF Radio-Frequency
RRH Remote Radio Head
RRU Remote Radio Unit
RSRQ Reference Signal Receive Quality
RSSI Received Signal Strength Indicator
SINR Signal-to-Interference-Plus-Noise Ratio
UL Uplink
WCDMA Wideband Code Division Multiple Access The terms "base station," "base station receiver," "access point," and "access component" may be used interchangeably in this disclosure. The terms "user device," "mobile device," "mobile handset" and "mobile transmitting element" may be used interchangeably in this disclosure. In relating these two elements, a base station and a mobile handset may be paired for uplink and downlink transmission for communication or exchange of RF transmissions over a network. A "transmitting/receiving component" or "communication component" refers to an element associated with a base station that transmits and receives signals to a broadcast arc served by the base station, and is configured to transmit and receive signals to and from mobile handsets.

BRIEF DESCRIPTION OF THE DRAWINGS

Illustrative embodiments of the present invention are described in detail below with reference to the attached drawing figures, wherein.

DETAILED DESCRIPTION

Figure 1:
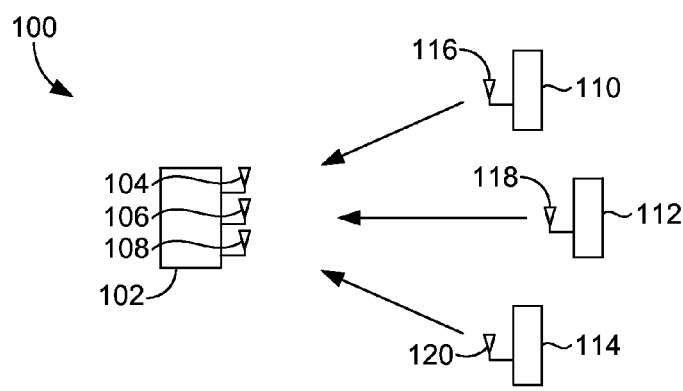
FIG. 1 illustrates an exemplary network diagram including a base station in communication with multiple mobile handsets, in accordance with an aspect of the present invention.

The subject matter of select embodiments of the present invention is described with specificity herein to meet statutory requirements. However, the description itself is not intended to define the scope of the invention. The claimed subject matter might be embodied in other ways to include different features, elements, components, steps, or combinations of steps, similar to the ones described in this document, and in conjunction with other present or future technologies. Moreover, although the term "step" might be used herein to connote different elements of the methods employed, this term should not be interpreted as implying any particular order among or between various steps herein disclosed unless and except the order of individual steps is explicitly described or required.

Embodiments of the technology may be embodied as, among other things, a method, system, or computer-program product. Accordingly, the embodiments may take the form of a hardware embodiment, or an embodiment combining software and hardware. In one embodiment, the present invention takes the form of a computer-program product that includes computer-useable instructions embodied on one or more computer-readable media or devices.

Computer-readable media include both volatile and nonvolatile media, removable and non-removable media, and contemplate media readable by a database, a switch, and various other network devices. Network switches, routers, and related components are conventional in nature, as are means of communicating with the same. By way of example, and not limitation, computer-readable media comprises computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Multiple User Multiple Input Multiple Output (MU-MIMO) is a technique where the same physical air interface resources are used by multiple users in an uplink or downlink connection with a base station. Traditionally, the base station establishes uplink (or downlink) transmission with a mobile handset over a single frequency that is exclusive to that particular uplink connection (e.g., an LTE connection with an EnodeB). In this regard, typically only one active uplink connection can occur per frequency. MU-MIMO allows multiple users to be paired for uplink over the same frequency, allowing transfer of data over the same physical air resources. This increases efficiency of use of existing resources, at the cost of more expensive or intricate signal processing. Traditionally, MU-MIMO pairing of two mobile handsets with a transmitting/receiving component of a base station can only occur when there is at least 90 degrees of separation between the mobile handsets with respect to the transmitting/receiving component of the base station with which the mobile handsets are in communication. In other words, there must be at least orthogonal separation between paired mobile handsets in relation to the transmitting/receiving component.

The base station may include one or more sectors served by individual transmitting/receiving components associated with the base station (e.g., antenna arrays controlled by an EnodeB). These transmitting/receiving components together form a multi-sector broadcast arc for communication with mobile handsets linked to the base station. Instead of pairing mobile handsets for MU-MIMO uplink or downlink transmission within each sector by locally monitoring the location of each mobile handset served by the transmitting/receiving component, a central server or processing unit can monitor the location of mobile handsets across multiple sectors of the base station, allowing greater flexibility in MU-MIMO pairing of the mobile handsets. In one example, the base station may include three broadcast sectors, each broadcast sector covering a 120 degree arc, or rather, ⅓ of the 360 degree broadcast arc from the base station. Traditionally, only two users may be paired simultaneously in a single one of these sectors using MU-MIMO uplink transmission, since mobile handsets served within each broadcast arc must have orthogonal separation with each other in order to be paired for MU-MIMO uplink transmission with the transmitter/receiving component serving that particular 120 degree sector. However, by centrally monitoring the location of the mobile handsets across multiple sectors of the base station, additional pairing can be facilitated.

In one embodiment, a server may be configured to monitor the angle of separation between mobile handsets in each of the three broadcast sectors, and determine, using location information sent to the server from each of the mobile handsets, if any of the mobile handsets across the three broadcast sectors have at least 90 degrees of separation from a common transmitting/receiving component. In this regard, the server is configured to determine if any two mobile handsets across the broadcast sectors can be paired for MU-MIMO uplink transmission with a common transmitting/receiving component. Regardless of the division of the broadcast arcs or the number of handsets across different broadcast arcs, efficiency of physical air resources can be enhanced by linking MU-MIMO pairing across different sectors served by a single base station. A central server or processing unit allows broad control over the MU-MIMO pairing, rather than local control at the transmitting/receiving component that is controlling and communicating with a single broadcast arc.

The location information received from each of the mobile handsets may include a GPS location. The server may be configured to send a signal to each of the mobile handsets, and/or the base station, and/or a transmitting/receiving component when it is determined that two mobile handsets have at least 90 degrees of separation between each other in relation to a common transmitting/receiving component, and instruct the mobile handsets to be paired, and/or instruct the base station or an associated component to facilitate the pairing. The pairing of the mobile handsets may allow both uplink and downlink transmission between the mobile handsets and the base station. The server may also be configured to generate and send instructions to the mobile handsets paired for MU-MIMO uplink transmission and the base station with which the mobile handsets are being paired. The server may be configured to continually monitor the location of the paired handsets, and unpair the paired mobile handsets when the paired mobile handsets no longer have orthogonal separation from the base station or associated transmitting/receiving component.

The method of pairing mobile handsets for MU-MIMO uplink transmission may further include receiving a third signal providing a third location of a third mobile handset that communicates with a third sector of the base station, determining from the first, second, and third locations if the first, second, and third mobile handsets are transmitting to the base station from angles of separation that are at least 90 degrees from each other, and upon determining that the first, second, and third user devices are transmitting to the base station from angles of separation that are at least 90 degrees from each other, pairing the first, second, and third mobile handsets for MU-MIMO uplink transmission with the base station. The method may be repeated to include additional mobile handsets being paired across different sectors served by a base station, allowing a maximum possible number of MU-MIMO pairings of mobile handsets across a broadcast arc served by a base station. Further, the server may be configured to monitor, track, and update the number of pairings and send instructions accordingly. The server may also monitor the number and amount of connections occurring over a single frequency, and monitor performance, capacity, and capability of the frequency served by a base station transmitting/receiving component.

The first and the second access components, and also the associated transmitting/receiving components serving sectors associated with each of the first and second access components, may have broadcast arcs that overlap, allowing pairing of mobile handsets across different access components. A central server may be configured to receive and monitor the location information from mobile handsets across the different access components, and sectors within the same, to take advantage of these possible pairings. The server may compare the location of the mobile handsets intermittently or continuously to the location of various access components (e.g., macro or micro cells) with which the mobile handsets can communicate (i.e., where network coverage overlaps), and determine if MU-MIMO pairing is possible by transferring a mobile handset from a first access component to a second access component where there would be orthogonal separation between mobile handsets. In this regard, the server may compute the angle of separation between the different mobile handsets and different access components serving different mobile handsets within the same general area of coverage. The server can monitor macro and micro cells, maximizing pairing potential from overlap of sectors.

In reference to FIG. 1, an exemplary network diagram 100 including a base station 102 in communication with multiple mobile handsets 110, 112, 114 is depicted, in accordance with an aspect of the present invention. In FIG. 1, the base station 102 includes first, second, and third transmitting/receiving components 104, 106, 108 for transmitting to first, second, and third mobile handsets 110, 112, 114, respectively, over individual frequencies or even the same frequency. These transmitting/receiving components may be antennas or RF transmitters controlled by the base station, and may cover individual or overlapping broadcast sectors. Additionally, the first, second, and third mobile handsets 110, 112, 114 further include respective first, second, and third transmitting/receiving components 116, 118, 120 for communication with the base station 102. The mobile handsets 110, 112, 114 may be coupled for uplink transmission with the base station 102, as indicated with the arrows.

Figure 2:
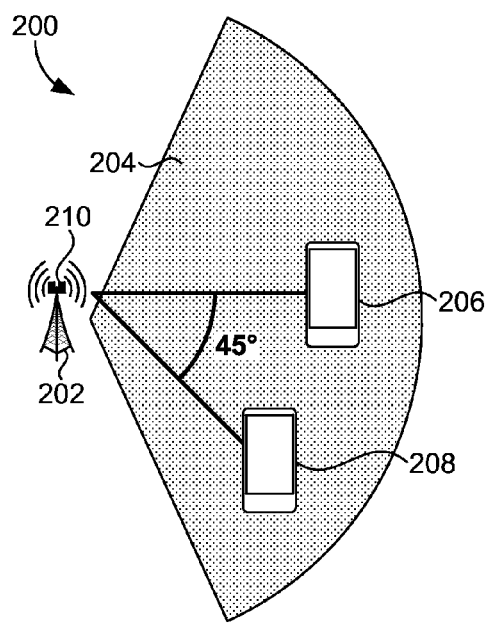
FIG. 2 illustrates an exemplary network diagram including a base station with a first broadcast sector and multiple mobile handsets served within the first broadcast sector, in accordance with an aspect of the present invention.

In reference to FIG. 2, an exemplary network diagram 200 including a base station 202 with a first broadcast sector 204 and multiple mobile handsets 206, 208 served within the first broadcast sector 204 is depicted, in accordance with an aspect of the present invention. In FIG. 2, the first broadcast sector 204 is covered by a first transmitting/receiving component 210 (e.g., an antenna controlled by an EnodeB for LTE setup) from the base station 202 and covers approximately ⅓ of the total 360 degree broadcast arc, or 120 degrees. The first mobile handset 206 is coupled for uplink transmission with the first transmitting/receiving component 210. A second mobile handset 208 is also coupled for uplink transmission with the first transmitting/receiving component 210. However, because the first and second handsets 206, 208 do not have orthogonal separation (i.e., they are separated by less than 90 degrees) and only have 45 degree separation with respect to the first transmitting/receiving component 210, MU-MIMO pairing of the mobile handsets 206, 208 with the first transmitting/receiving component 210 is not possible. Rather, the first and second mobile handsets 206, 208 must communicate with the base station 202 over separate frequencies.

Figure 3:
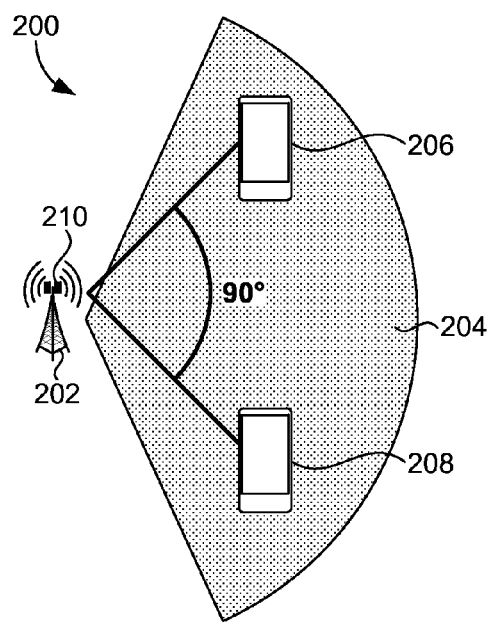
FIG. 3 illustrates an exemplary network diagram including a base station with a first broadcast sector and multiple mobile handsets served within the first broadcast sector, the mobile handsets configured for MU-MIMO pairing, in accordance with an aspect of the present invention.

In reference to FIG. 3, the exemplary network diagram 200 shown in FIG. 2 with the mobile handsets 206, 208 positioned for MU-MIMO pairing is depicted, in accordance with an aspect of the present invention. In FIG. 3, the first mobile handset 206 and the second mobile handset 208 have orthogonal separation with respect to the first transmitting/receiving component 210 of the base station 202 (i.e., 90 degree separation). Thus, the first and second mobile handsets 206, 208 can be paired for MU-MIMO uplink transmission with the first transmitting/receiving component 210 of the base station 202, allowing uplink transmission with the first transmitting/receiving component over the same frequency.

Figure 4:
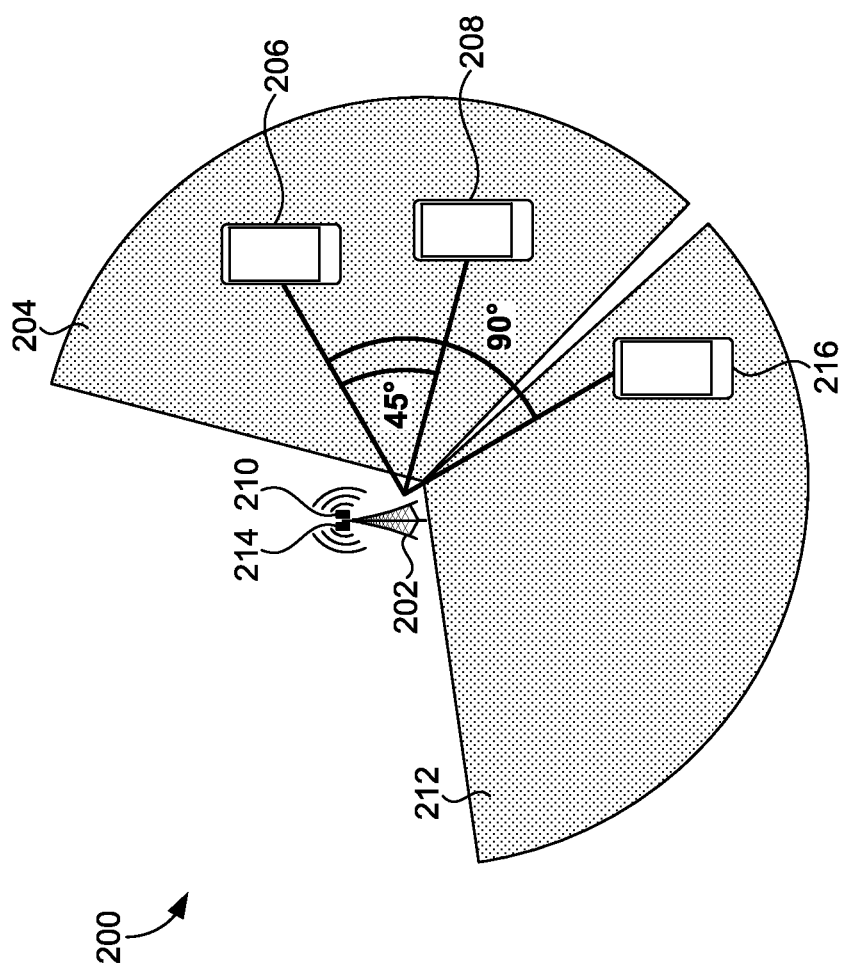
FIG. 4 illustrates an exemplary network diagram including a base station with multiple broadcast sectors and multiple mobile handsets served within different broadcast sectors of the base station, with selected mobile handsets configured for MU-MIMO pairing, in accordance with an aspect of the present invention.

In reference to FIG. 4, the exemplary network diagram 200 of FIGS. 2-4 is depicted further including a base station 202 with multiple broadcast sectors 210, 214 and multiple mobile handsets 206, 208, 216 served within different broadcast sectors 204, 212 of the base station 202, the mobile handsets 206, 216 configured for MU-MIMO pairing, in accordance with an aspect of the present invention. In FIG. 4, a base station 202 is shown providing coverage to a first broadcast sector 204 and a second broadcast sector 212 individually with a first transmitting/receiving component 210 and a second transmitting/receiving component 214, respectively. The first and second mobile handsets 206, 208 are in communication with the base station 202 via the first broadcast sector 204 and associated first transmitting/receiving component 210, and a third mobile handset 216 is in communication with the base station 202 via the second broadcast sector 212 and the associated second transmitting/receiving component 214. The first and second mobile handsets 206, 208 only have 45 degrees of separation from the first transmitting/receiving component 210 in the first sector 204, and thus do not have sufficient separation to be paired for MU-MIMO uplink transmission with the first transmitting/receiving component 210. However, the first and third mobile handsets 206, 216 have orthogonal separation, and by using a central server, control, or device for monitoring the angular separation of the mobile handsets 206, 216 in different sectors 204, 212 relative to the first or the second transmitting/receiving components 210, 214 associated with the first and the second broadcast sectors 204, 212, respectively, the first and the third mobile handsets 206, 216 can be paired for MU-MIMO uplink transmission with one of the first and the second transmitting/receiving components 210, 214 with which the mobile handsets 206, 216 have at least 90 degrees of angular separation.

Figure 5:
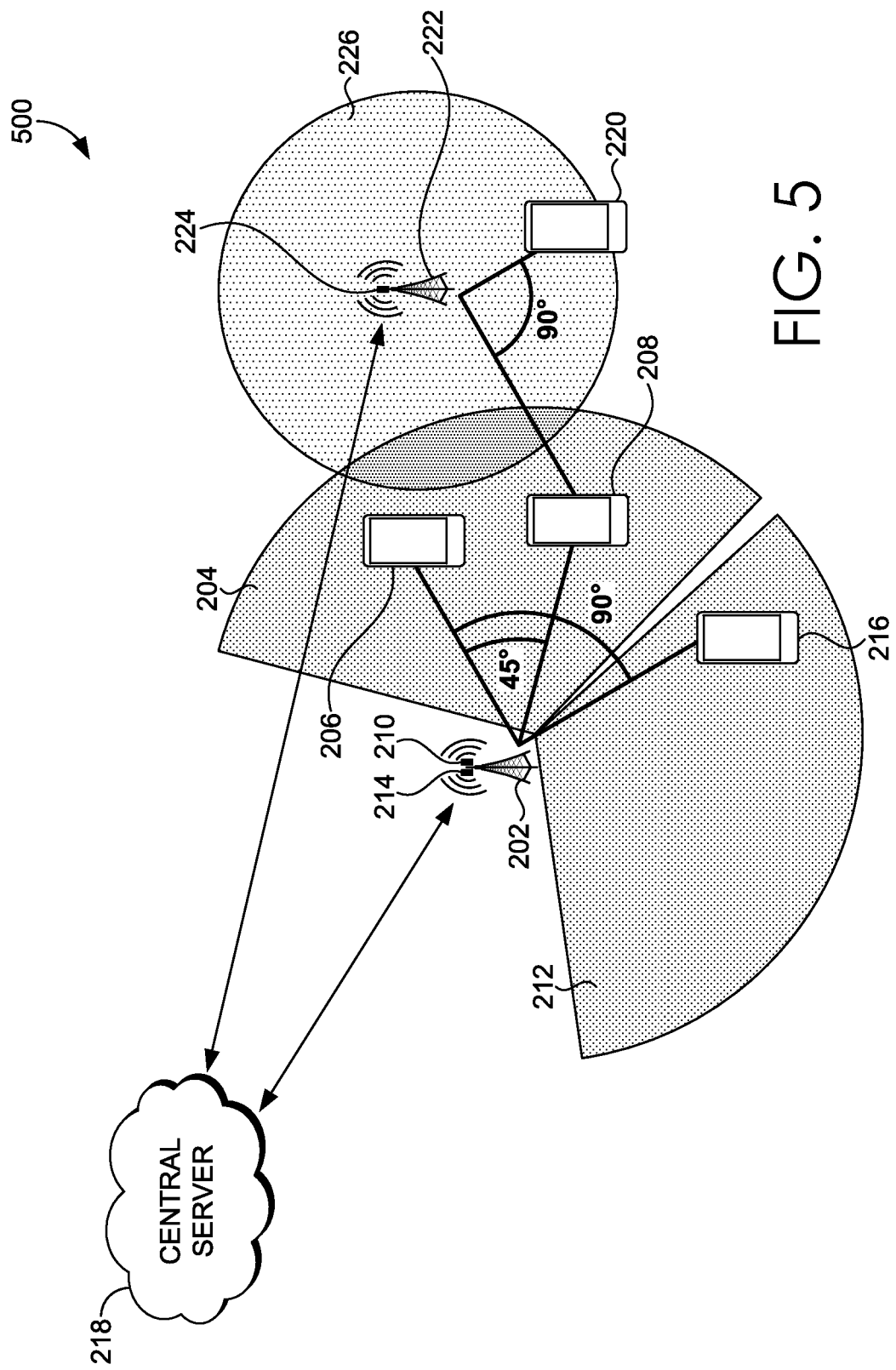
FIG. 5 illustrates an exemplary network configuration with a server, multiple base stations, and multiple mobile devices with selected devices configured for MU-MIMO pairing, in accordance with an aspect of the present invention.

In reference to FIG. 5, an exemplary network configuration 500 with a server 218, multiple base stations 202, 224, and multiple mobile devices 206, 208, 216, 220 configured for MU-MIMO pairing is depicted, in accordance with an aspect of the present invention. In FIG. 5, a central server 218 is shown monitoring the location of the individual mobile handsets 206, 208, 216 which are in communication with the first and second transmitting/receiving components 210, 214 associated with the base station 202. The central server 218 is also monitoring the location of a fourth mobile handset 220 in communication with an additional access point 222 (e.g., a microcell with a smaller area of coverage 226) that includes a transmitting/receiving component 224 that is in communication with the fourth mobile handset 220. By monitoring the location of the mobile handsets 206, 208, 216, 220, MU-MIMO pairing can be identified and facilitated between multiple handsets served by different sectors 204, 212 of the base station and also between mobile handsets served by the access point 222, allowing pairing between the base station 202 and access point 222, assuming coverage areas overlap and the paired mobile handsets have at least 90 degrees of separation from at least one common transmitting/receiving component 210, 214, 224.

Figure 6:
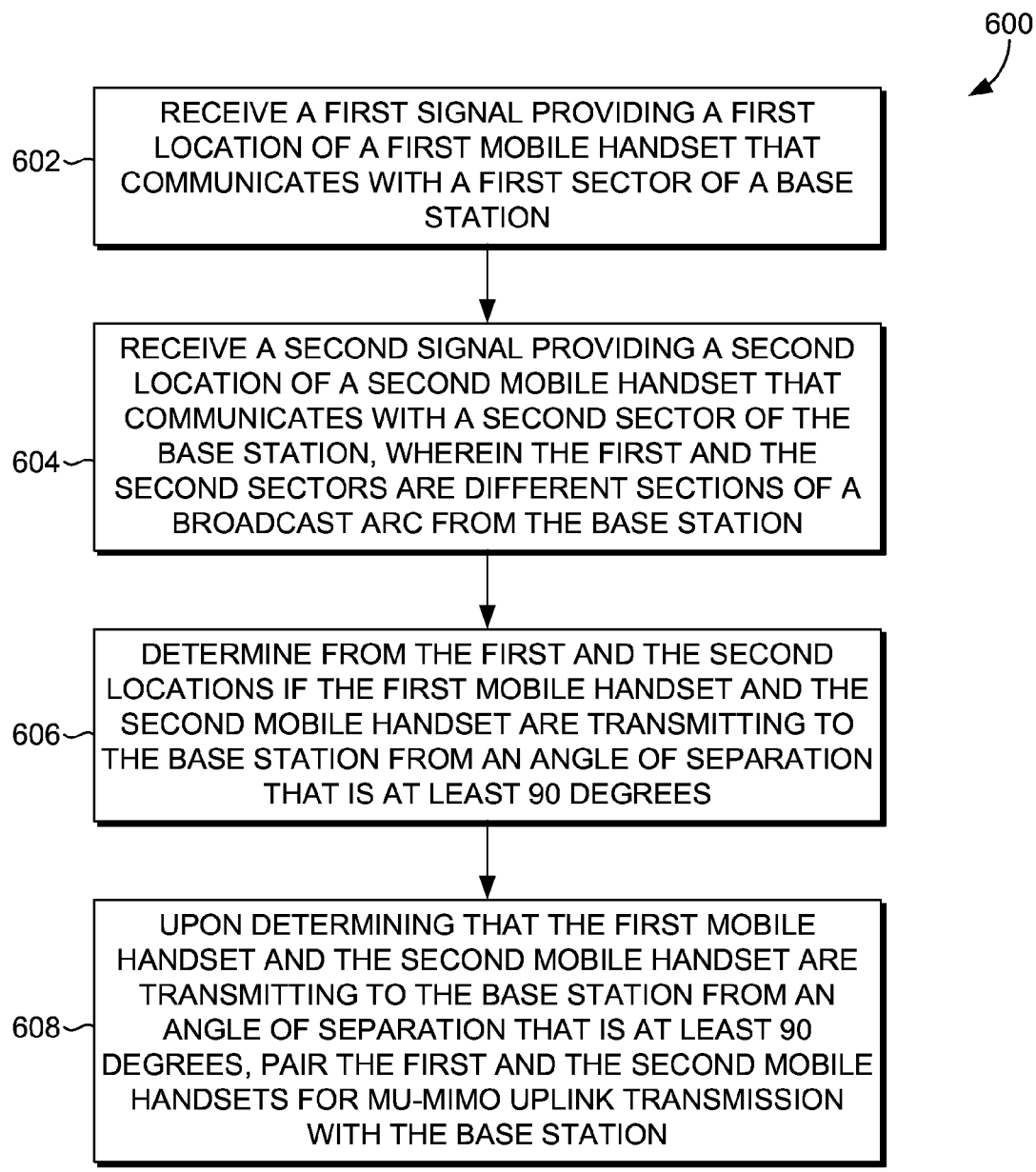
FIG. 6 illustrates a flow chart of a first exemplary method for providing MU-MIMO pairings in a network, in accordance with an aspect of the present invention.

In reference to FIG. 6, a flow chart for a first exemplary method 600 for providing MU-MIMO pairings in a network is provided, in accordance with an aspect of the present invention. At a first block 602, a first signal is received providing a first location of a first mobile handset that communicates with a first sector of a base station. At a second block 604, a second signal is received providing a second location of a second mobile handset that communicates with a second sector of the base station, wherein the first and the second sectors are different sections of a broadcast arc from the base station. At a third block 606, it is determined from the first and the second locations if the first mobile handset and the second mobile handset are transmitting to the base station from an angle of separation that is at least 90 degrees. At a fourth block 608, upon determining that the first mobile handset and the second mobile handset are transmitting to the base station from an angle of separation that is at least 90 degrees, the first and the second mobile handsets are paired for MU-MIMO uplink transmission with the base station.

Figure 7:
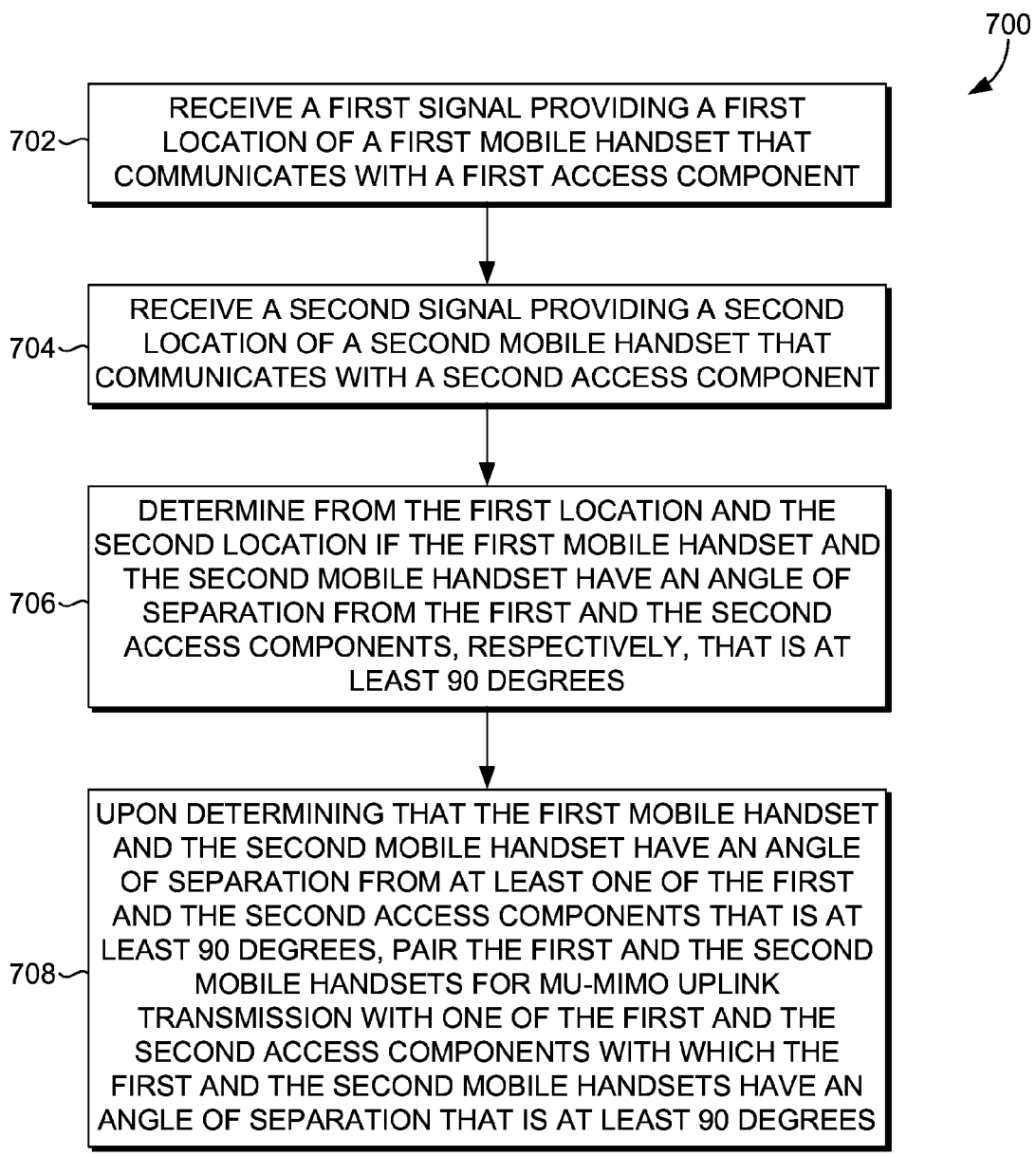
FIG. 7 illustrates a flow chart of a second exemplary method for providing MU-MIMO pairings in a network, in accordance with an aspect of the present invention.

In reference to FIG. 7, a flow chart for a second exemplary method for providing MU-MIMO pairings in a network is provided, in accordance with an aspect of the present invention. At a first block 702, a first signal is received providing a first location of a first mobile handset that communicates with a first access component. At a second block 704, a second signal is received providing a second location of a second mobile handset that communicates with a second access component. At a third block 706, it is determined form the first location and the second location if the first mobile handset and the second mobile handset have an angle of separation from the first and the second access components, respectively, that is at least 90 degrees. At a fourth block 708, upon determining that the first mobile handset and the second mobile handset have an angle of separation from at least one of the first and the second access components that is at least 90 degrees, the first and the second mobile handsets are paired for MU-MIMO uplink transmission with one of the first and the second access components with which the first and the second mobile handsets have an angle of separation that is at least 90 degrees.

Figure 8:
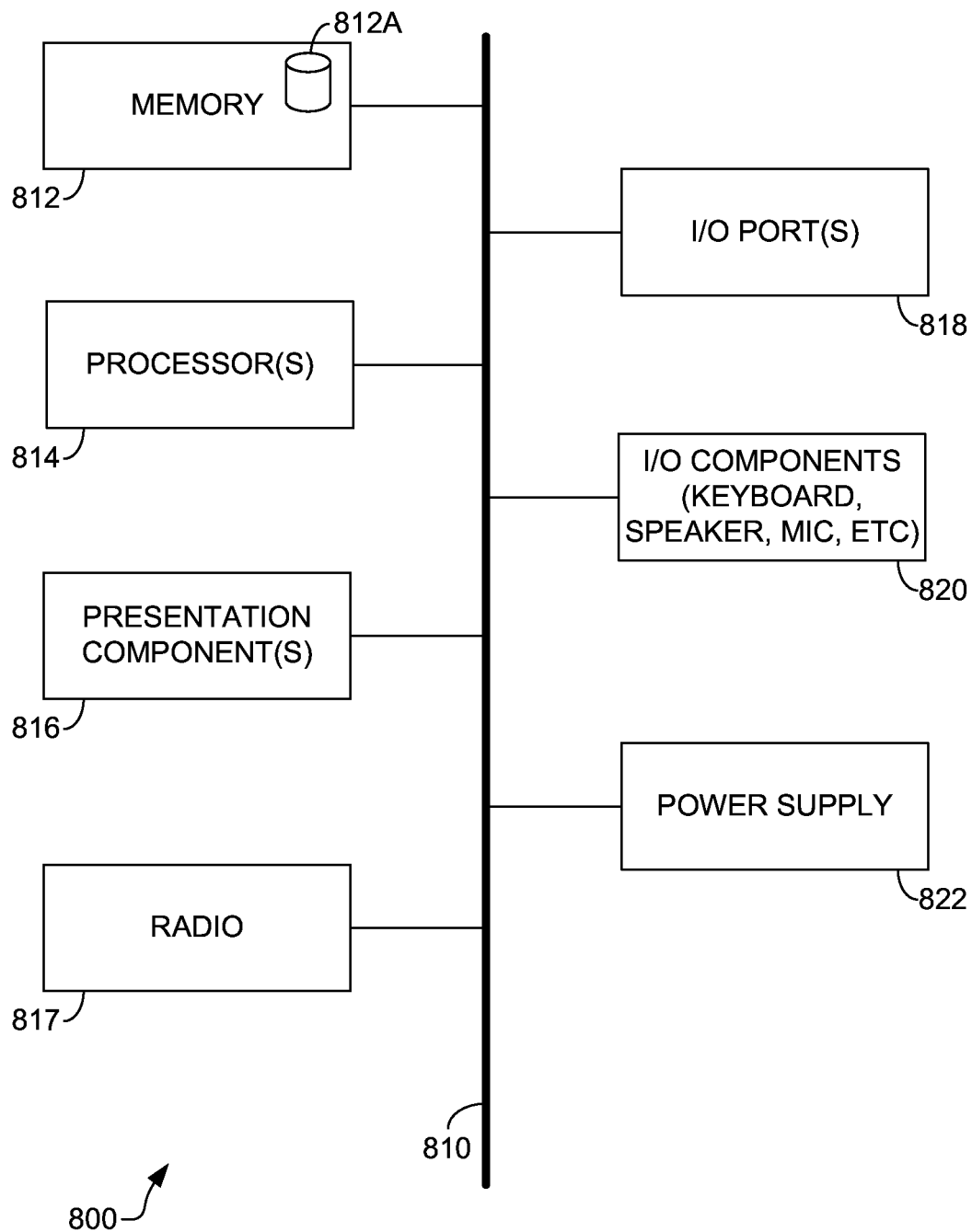
FIG. 8 illustrates an exemplary system diagram for a network configured to provide MU-MIMO pairings for uplink and downlink transmission.

In reference to FIG. 8, an exemplary system diagram for a network configured to provide MU-MIMO pairings for uplink and downlink transmission is provided, in accordance with an aspect of the present invention. In FIG. 8, the exemplary system includes a memory 812 having a set of computer-executable instructions 812A, one or more processors 814, one or more presentation components 816, one or more radio components 817 (which may be a transmitter, receiver, antenna, etc.), one or more I/O ports 818, one or more I/O components 820, which may be, for example, a keyboard, speaker, microphone, etc., and a power supply 822.

Many different arrangements of the various components depicted, as well as components not shown, are possible without departing from the scope of the claims below. Embodiments of the technology have been described with the intent to be exemplary rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated as within the scope of the claims.

What is claimed is:

1. A method for providing MU-MIMO pairings in a network, the method comprising:
    receiving a first signal providing a first location of a first mobile handset that communicates with a first transmitting and receiving component serving a first sector of a base station;
    receiving a second signal providing a second location of a second mobile handset that communicates with a second transmitting and receiving component serving a second sector of the base station that is distinct from the first sector, wherein the first and second sectors provide different sections of at least a portion of a broadcast arc from the base station;
    determining, by a central processing unit, from the first and the second locations if the first mobile handset and the second mobile handset are transmitting to the base station from an angle of separation that is at least 90 degrees across the first and second sectors, wherein the central processing unit controls mobile handset pairing across the first and second transmitting and receiving components of the respective first and second sectors; and
    upon determining that the first mobile handset and the second mobile handset are transmitting to the base station from an angle of separation that is at least 90 degrees across the first and second sectors, pairing the first and second mobile handsets for MU-MIMO uplink transmission with a common one of the first or the second transmitting and receiving components of the base station.

2. The method of claim 1, wherein the first and second signals each include a GPS location for the respective first and second mobile handsets.

3. The method of claim 1, further comprising sending a signal to the first and the second mobile handsets indicating that the first and the second mobile handsets are paired for MU-MIMO uplink transmission with the common one of the first or the second transmitting and receiving components of the base station.

4. The method of claim 1, further comprising sending a signal from the central processing unit to the base station indicating that the first and the second mobile handsets are paired for MU-MIMO uplink transmission with the common one of the first or the second transmitting and receiving components of the base station.

5. The method of claim 1, wherein pairing the first and the second mobile handsets allows the first and the second mobile handsets to communicate with the common one of the first or the second transmitting and receiving components of the base station simultaneously over the same frequency.

6. The method of claim 1, wherein pairing the first and the second mobile handsets permits downlink transmission between the common one of the first or the second transmitting and receiving components of the base station and the first and the second mobile handsets over the same frequency.

7. The method of claim 1, further comprising sending a signal to unpair the first and the second mobile handsets from the common one of the first or the second transmitting and receiving components of the base station when it is determined, at the central processing unit, that the first and the second mobile handsets are no longer transmitting to the base station from an angle of separation that is at least 90 degrees.

8. The method of claim 1, further comprising:
    receiving a third signal providing a third location of a third mobile handset that communicates with a third transmitting and receiving component serving a third sector of the base station,
    determining from the first, second, and third locations if the first, second, and third mobile handsets are transmitting to the base station from angles of separation that are at least 90 degrees from each other across the first, second, and third sectors, and
    upon determining that the first, second, and third mobile handsets are transmitting to the base station from angles of separation that are at least 90 degrees from each other across the first, second, and third sectors, pairing the first, second, and third mobile handsets for MU-MIMO uplink transmission with a common one of the first, second, or third transmitting and receiving components of the base station.

9. The method of claim 8, further comprising:
    receiving a fourth signal providing a fourth location of a fourth mobile handset that communicates with a fourth transmitting and receiving component serving a fourth sector of the base station,
    determining from the first, second, third, and fourth locations if the first, second, third, and fourth mobile handsets are transmitting to the base station from angles of separation that are at least 90 degrees from each other across the first, second, third, and fourth sectors, and
    upon determining that the first, second, third, and fourth mobile handsets are transmitting to the base station from angles of separation that are at least 90 degrees from each other across the first, second, third, and fourth sectors, pairing the first, second, third, and fourth mobile handsets for MU-MIMO uplink transmission with a common one of the first, second, third, and fourth transmitting and receiving components of the base station.

10. A method for providing MU-MIMO pairings in a network, the method comprising:
    receiving a first signal providing a first location of a first mobile handset that communicates with a first transmitting and receiving component serving a first sector of a first access component;
    receiving a second signal providing a second location of a second mobile handset that communicates with a second transmitting and receiving component serving a second sector of a second access component;
    determining, at a central processing unit in communication with the first access component and the second access component, from the first location and the second location if the first mobile handset and the second mobile handset have an angle of separation from at least one of the first and the second transmitting and receiving components that is at least 90 degrees; and
    upon determining that the first mobile handset and the second mobile handset have an angle of separation from at least one of the first and the second transmitting and receiving components that is at least 90 degrees, pairing, by the central processing unit, the first and the second mobile handsets for MU-MIMO uplink transmission with one of the first and the second transmitting and receiving components with which the first and the second mobile handsets have an angle of separation that is at least 90 degrees.

11. The method of claim 10, wherein the first and the second signals each include a GPS location for the respective first and second mobile handsets.

12. The method of claim 10, further comprising sending a signal from the central processing unit to the first and the second mobile handsets indicating that the first and the second mobile handsets are paired for MU-MIMO uplink transmission with the first or the second transmitting and receiving component with which the mobile handsets are paired.

13. The method of claim 10, further comprising sending a signal to the first or the second access component associated with the first or the second transmitting and receiving component with which the first and the second mobile handsets are paired that the first and the second mobile handsets are paired for MU-MIMO uplink transmission.

14. The method of claim 10, wherein pairing the first and the second mobile handsets permits downlink transmission over the same frequency between the first and the second mobile handsets and the first or the second transmitting and receiving component with which the first and second mobile handsets are paired.

15. The method of claim 10, wherein pairing the first and the second mobile handsets allows the first and the second mobile handsets to transmit simultaneously over the same frequency data to and from the first or the second access component associated with the first or the second transmitting and receiving component with which the first and the second mobile handsets are paired.

16. The method of claim 10, further comprising sending a signal to unpair the first and the second mobile handsets from the first or the second transmitting and receiving component with which they are paired when the first and the second mobile handsets are no longer transmitting to the transmitting and receiving component with which they are paired from an angle of separation that is at least 90 degrees.

17. The method of claim 10, further comprising:
receiving a third signal providing a third location of a third mobile handset that communicates with a third transmitting and receiving component serving a third sector of a third access component,
determining from the first, second, and third locations if the first, second, and third mobile handsets have an angle of separation from each other in relation to at least one of the first, second, and third transmitting and receiving components that is at least 90 degrees; and
upon determining that the first, second, and third mobile handsets have an angle of separation from each other in relation to at least one of the first, second, and third transmitting and receiving components that is at least 90 degrees, pairing the first, second, and third mobile handsets for MU-MIMO uplink transmission with one of the first, second, and third transmitting and receiving components with which the first, second, and third mobile handsets have an angle of separation that is at least 90 degrees.

18. A system for providing MU-MIMO pairings in a network, the system comprising:
a server in communication with first and second access components, the server comprising one or more non-transitory computer-readable media storing computer-useable instructions thereon that, when used by the server, allow the server to:
receive a first signal providing a first location of a first mobile handset communicating with a first transmitting and receiving component serving a first sector of the first access component;
receive a second signal providing a second location of a second mobile handset communicating with a second transmitting and receiving component serving a second sector of the second access component;
determine from the first and the second locations if an angle of separation between the first and the second mobile handsets relative to at least one of the first and the second transmitting and receiving components of the respective first and second access components is at least 90 degrees; and
upon determining that the angle of separation between the first and the second mobile handsets is at least 90 degrees with respect to at least one of the first and the second transmitting and receiving components of the respective first and second access components, pairing the first and the second mobile handsets for MU-MIMO uplink transmission with one of the first and the second transmitting and receiving components of the respective first and second access components with which the first and the second mobile handsets have an angle of separation that is at least 90 degrees.

19. The system of claim 18, wherein the server is further configured to unpair the first and the second mobile handsets when the first and second mobile handsets no longer have an angle of separation from the paired transmitting and receiving component that is at least 90 degrees.

20. The system of claim 18, wherein the server is in communication with the first and second access components to control pairing of the first and the second mobile handsets across the first and second sectors.

* * * * *